(12) United States Patent
Chae

(10) Patent No.: US 9,817,210 B2
(45) Date of Patent: Nov. 14, 2017

(54) IMAGE PICKUP LENS, AND CAMERA MODULE AND DIGITAL DEVICE INCLUDING THE SAME

(71) Applicant: LG Innotek Co., Ltd., Seoul (KR)

(72) Inventor: Kyung Pil Chae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 28 days.

(21) Appl. No.: 14/972,808

(22) Filed: Dec. 17, 2015

(65) Prior Publication Data

US 2016/0178868 A1 Jun. 23, 2016

(30) Foreign Application Priority Data

Dec. 17, 2014 (KR) .................. 10-2014-0182270

(51) Int. Cl.
  *G02B 9/34* (2006.01)
  *G02B 13/00* (2006.01)
  *G02B 27/00* (2006.01)
(52) U.S. Cl.
  CPC ............. *G02B 9/34* (2013.01); *G02B 13/004* (2013.01); *G02B 27/0062* (2013.01)
(58) Field of Classification Search
  CPC ................................. G02B 9/34; G02B 13/004

USPC ................................................ 359/762, 770
See application file for complete search history.

(56) References Cited

U.S. PATENT DOCUMENTS

2010/0188757 A1* 7/2010 Saitoh .................. G02B 13/06
  359/715
2016/0139362 A1* 5/2016 Kawasaki ............ G02B 13/004
  359/715

FOREIGN PATENT DOCUMENTS

KR         20140056494 A      5/2014

* cited by examiner

*Primary Examiner* — Darryl J Collins
(74) *Attorney, Agent, or Firm* — Saliwanchik, Lloyd & Eisenschenk

(57) ABSTRACT

Embodiments provide an image pickup lens including a first lens to a fourth lens arranged in sequence from an object side to an image side, the first lens to the fourth lens each having refraction. The first lens and the second lens have negative refraction. The first lens has a second surface facing the image side, and a ratio of an effective radius to a radius of curvature in relation to the second surface is less than 0.96. The first lens, the second lens, and the fourth lens are formed of plastic.

19 Claims, 3 Drawing Sheets

[Fig. 3]
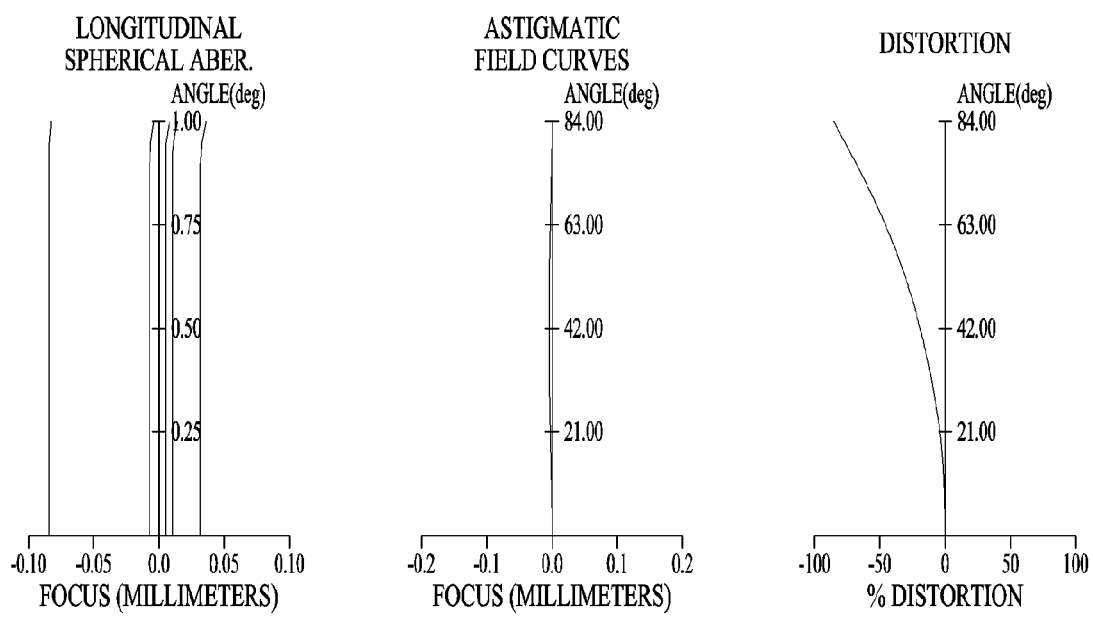

IMAGE PICKUP LENS, AND CAMERA MODULE AND DIGITAL DEVICE INCLUDING THE SAME

CROSS REFERENCE TO RELATED APPLICATION

This application claims priority under 35 U.S.C. §119 to Korean Patent Application No. 10-2014-0182270, filed on Dec. 17, 2014, which is hereby incorporated by reference in its entirety.

TECHNICAL FIELD

Embodiments relate to an image pickup lens, and to a camera module and a digital device including the same.

BACKGROUND

Conventional film cameras have been replaced with, for example, camera modules for portable terminals, Digital Still Cameras (DSCs), camcorders, and PC cameras (image pickup devices attached to personal computers), which use small solid image pickup elements such as, for example, CCDs and CMOSs. These image pickup devices are becoming much thinner and smaller.

According to this trend, although light receiving elements, such as Charge Coupled Devices (CCDs), mounted in smaller image pickup devices, are being reduced in size, a part that occupies the greatest volume of the image pickup device is an image pickup lens part.

Accordingly, a constituent element that is becoming the greatest obstacle to realizing smaller and thinner image pickup devices is an image pickup lens, which forms an image of an object.

Here, it is required not only to simply implement a small image pickup lens, but also to achieve high performance of the image pickup lens in order to keep up with the higher performance of the light receiving element. However, a smaller image pickup lens is unavoidably closer to the light receiving element, which problematically causes light to be obliquely incident on the image forming surface of the image pickup device, thereby resulting in insufficient condensing of the image pickup lens and the potential of extreme variation in the brightness of an image from the center to the periphery of the image.

Increasing the number of lenses in consideration of the problems described above unavoidably increases the size of the image pickup device and is problematic in terms of the cost.

Therefore, there is a need to implement a high performance image pickup lens while considering manufacturing costs.

BRIEF SUMMARY

Accordingly, embodiments provide a high performance image pickup lens having low manufacturing costs.

In one embodiment, there is provided an image pickup lens includes a first lens to a fourth lens arranged in sequence from an object side to an image side, the first lens to the fourth lens each having refraction, wherein the first lens and the second lens have negative refraction, wherein the first lens has a second surface facing the image side, and a ratio of an effective radius to a radius of curvature in relation to the second surface is less than 0.96, and wherein the first lens, the second lens, and the fourth lens are formed of plastic.

The second lens may have a second surface facing the image side, and a ratio of an effective radius to a radius of curvature in relation to the second surface is less than 0.96

The third lens and the fourth lens may have positive refraction.

The second lens may have a first surface facing the object side, and an effective radius of the first surface may be less than the effective radius of the second surface of the first lens.

An index of refraction of the third lens may be greater than 1.61 and less than 1.66.

An Abbe number of the third lens may be greater than 21 and less than 27.

Indices of refraction of the first lens, the second lens, and the fourth lens may be 1.5 or more.

Abbe numbers of the first lens, the second lens, and the fourth lens may be 50 or more.

The second surface of the first lens may be concave upward.

The second lens may have a second surface, the second surface being concave upward.

The third lens may have a meniscus shape so as to be concave toward the object side.

The image pickup lens may further include a stop located between the third lens and the fourth lens.

A distance between the stop and an object surface of the fourth lens may be 0.1 mm or less.

Both surfaces of the fourth lens may have a convex shape.

In another embodiment, there is provided a camera module including the image pickup lens described above, a filter configured to selectively transmit light, having passed through the image pickup lens, based on a wavelength, and a light receiving element configured to receive the light having passed through the filter.

The light receiving element may be an image sensor, and a horizontal and/or vertical length of a unit pixel of the image sensor may be 2 micrometers or less respectively.

In a further embodiment, there is provided a digital device including the camera module described above.

BRIEF DESCRIPTION OF THE DRAWINGS

Arrangements and embodiments may be described in detail with reference to the following drawings in which like reference numerals refer to like elements and wherein:

FIG. 3 is a graph illustrating aberrations of the image pickup lens, including longitudinal spherical aberration, astigmatic field curves, and distortion, in sequence from the left side.

DETAILED DESCRIPTION

Hereinafter, embodiments will be described with reference to the annexed drawings in order to concretely realize the objects as set forth above.

In the following description of the embodiments, "object surface" refers to the surface of a lens that faces the object side on the basis of the optical axis, and "image surface" refers to the surface of the lens that faces the image side on the basis of the optical axis.

In addition, in the embodiments, "+" power of the lens refers to a convergent lens, which converges parallel beams, and "−" power of the lens refers to a divergent lens, which diverges parallel beams.

Figure 1:
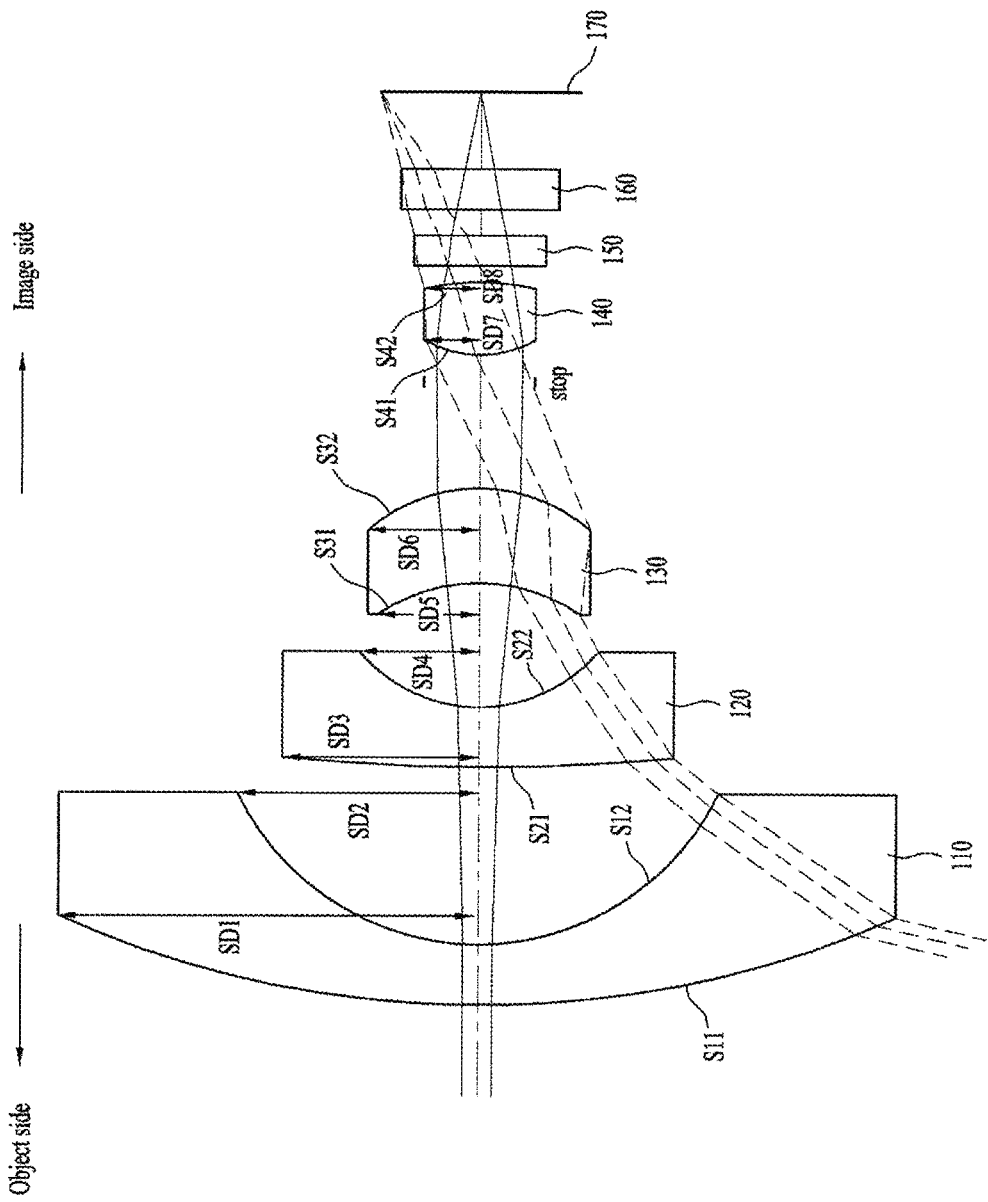
FIG. 1 is a view illustrating a first embodiment of an image pickup lens.

FIG. 1 is a view illustrating the configuration of an image pickup lens according to a first embodiment.

Referring to FIG. 1, the image pickup lens according to the first embodiment includes a first lens 110, a second lens 120, a third lens 130, and a fourth lens 140, which are arranged in sequence from the object side to the image side. A stop may be located between the third lens 130 and the fourth lens 140. In addition, a filter 150, a cover glass 160, and a light receiving element 170 may be arranged in sequence from the fourth lens 140 to the image side, so as to constitute the image pickup lens within a camera module.

The light receiving element 170 may be an image sensor, and the horizontal and/or vertical length of a unit pixel of the image sensor may be 2 μm (micrometers) or less. Some embodiments may provide the image pickup lenses that may be applied to camera modules having a high resolution of pixels and/or a large number of pixels, and these camera modules may include an image sensor or a light receiving element having a high resolution of pixels and/or a large number of pixels. In this case, the horizontal and/or vertical length of the unit pixel may be 2 μm or less.

In FIG. 1, "S11" is the object surface of the first lens 110, "S12" is the image surface of the first lens 110, "S21" is the object surface of the second lens 120, "S22" is the image surface of the second lens 120, "S31" is the object surface of the third lens 130, "S32" is the image surface of the third lens 130, "S41" is the object surface of the fourth lens 140, and "S42" is the image surface of the fourth lens 140.

"Sxy" as described above may be equally applied to the other embodiments of image pickup lenses, which will be described below.

The filter 150 may be an optical member having a flat plate shape, such as, for example, an infrared ray filter, the cover glass 160 may be an optical member such as, for example, cover glass for the protection of an image pickup surface, and the light receiving element 170 may be an image sensor disposed on a printed circuit board (not illustrated).

In the present embodiment, the first lens 110 may have a meniscus shape in which the object surface S11 is convex shape and a central region of the image surface S12 is concave. The second lens 120 may be configured such that the object surface S21 is convex or concave and a central region of the image surface S22 is concave. At least one of the object surface S21 and the image surface S22 may be an aspherical surface.

The third lens 130 may have a meniscus shape such that a surface thereof facing the image side is convex. Both surfaces of the fourth lens 140 may be convex, such that both the object surface S41 and the image surface S42 may be spherical surfaces, or at least one of the object surface S41 and the image surface S42 may be an aspherical surface.

When at least one surface of the respective lenses is configured as an aspherical surface, this may be advantageous for the correction of various aberrations such as, for example, spherical aberration, coma aberration, and distortion.

The object surfaces of the lenses have shapes as follows. The object surface S11 of the first lens 110 may have a convex shape, the object surface S21 of the second lens 120 may have a convex or concave shape, the object surface S31 of the third lens 130 may have a concave shape, and the object surface S41 of the fourth lens 140 may have a convex shape.

The image surfaces of the lenses have shapes as follows. The image surface S12 of the first lens 110 may have a concave shape in the central region thereof, the image surface S22 of the second lens 120 may have a concave shape in the central region thereof, the image surface S32 of the third lens 130 may have a concave shape, and the image surface S42 of the fourth lens 140 may have a convex shape.

Table 1 represents the radii of curvature and the effective radii of the object surfaces and the image surfaces of the first lens 110 to the fourth lens 140.

A case where the radius of curvature is large considers a case where a surface facing the object side is convex or concave, i.e. considers the magnitude of the absolute value of the radius of curvature without considering whether the radius of curvature has a negative (−) value or a positive (+) value.

TABLE 1

|  | Radius of curvature | Effective Radius |
| --- | --- | --- |
| Object surface of First lens 110 | 12.4580 (R1) | 4.6195 (SD1) |
| Image surface of First lens 110 | 2.5461 (R2) | 2.4088 (SD2) |
| Object surface of Second lens 120 | −771.5782 (R3) | 2.1500 (SD3) |
| Image surface of Second lens 120 | 1.7900 (R4) | 1.2248 (SD4) |
| Object surface of Third lens 130 | −2.1999 (R5) | 1.1126 (SD5) |
| Image surface of Third lens 130 | −1.5648 (R6) | 1.2201 (SD6) |
| Object surface of Fourth lens 140 | 1.2491 (R7) | 0.6014 (SD7) |
| Image surface of Fourth lens 140 | −21.0821 (R8) | 0.5818 (SD8) |

The ratio SD2/R2 of the effective radius SD2 to the radius of curvature R2 in the concave central region of the image surface S12 of the first lens 110 may be less than 0.96, and, for example, may be 0.946. The ratio SD4/R4 of the effective radius SD4 to the radius of curvature R4 in the concave central region of the image surface S22 of the second lens 120 may be less than 0.96, and for example, may be 0.684.

Although the high SD2/R2 and SD4/R4 values given above are advantageous in order to improve the resolution of the image pickup lens, the manufacture of the image pickup lens may become difficult when these values are excessively high.

In addition, the effective radius SD3 of the object surface S21 of the second lens 120 facing the object side may be less than the effective radius SD2. At this time, all of the light refracted at the image surface S12 of the first lens 110 having the effective radius SD2 may be directed to a range within the effective radius SD3 of the object surface S21 of the second lens 120 facing the object side.

In addition, the effective radius SD2 in the concave central region of the image surface S12 of the first lens 110 may be greater than the radius D2 of the second lens 120, and the effective radius SD4 in the concave central region of the image surface S22 of the second lens 120 may be equal to or greater than the radius D5 of the second lens 130.

Here, the shapes of the object surface and the image surface of each lens indicate shapes near the optical axis, and when the object surface and the image surface of each lens have points of inflection, the object surface and the image surface may have different shapes in an area far from the optical axis.

In FIG. 1, the first lens 110 and the second lens 120 may have a "−" power arrangement. More specifically, the refraction of the first lens 110 may be −0.1627, and the refraction of the second lens 120 may be −0.2980.

In addition, the third lens 130 and the fourth lens 140 may have a "+" power arrangement. More specifically, the refraction of the third lens 130 may be 0.2018, and the refraction of the fourth lens 140 may be 0.4464. The refraction of the entire optical system may be 1.2816, without being limited thereto.

due to a relatively high transition point, which easily causes deformation of a mold and increases manufacturing costs due to frequent mold replacement. In contrast, the plastic lens makes it easy to form an aspherical surface and is advantageous for the manufacture of small lenses.

Although not illustrated, the surfaces of the respective lenses may be subjected to coating to prevent reflection or to enhance surface hardness.

Table 3 represents conic constants k and asphericities A to G of the respective lens surfaces, and blanks correspond to zero asphericity.

TABLE 3

|  | K | A | B | C | D | E | F | G |
|---|---|---|---|---|---|---|---|---|
| S11 |  |  |  |  |  |  |  |  |
| S12 |  |  |  |  |  |  |  |  |
| S21 | 115385.69652 | 0.482203E−02 | −0.363358E−03 | −0.211385E−03 | 0.132456E−03 | −0.126899E−04 | −0.155412E−05 | 0.250715 R−06 |
| S22 | −0.700000 | 0.435557E−01 | 0.752831E−01 | −0.658934E−01 | 0.231049E−01 |  |  |  |
| S31 | 0.00000 | 0.247788E−01 | −0.600760E−01 | 0.136809E−01 | 0.845221E−03 | 0.513095E−14 |  |  |
| S32 | −3.970271 | −0.656390E−01 | 0.870401E−02 | 0.000000E+00 |  |  |  |  |
| S41 | 0.757304 | 0.102758E+00 | 0.153662E+00 | −0.399123E−01 | −0.655213E−01 |  |  |  |
| S42 | 0.00000 | 0.299541E+00 | 0.814631E+00 | −0.163519E+1 | 0.458711E+01 | 0.331612E−15 |  |  |

With the power arrangements of the first lens 110 to the fourth lens 140 as described above, enhanced optical performance, lower manufacturing costs, and smaller size of the image pickup lens may be anticipated.

In the present embodiment, the focal distance f of the entire optical system may be 0.7803, the focal distance of the first lens 110 may be −6.1451, the focal distance of the second lens 120 may be −3.3561, the focal distance of the third lens 130 may be 4.9550, and the focal distance of the fourth lens 140 may be 2.2401.

Table 2 represents the index of refraction and the Abbe number of each of the first lens 110 to the fourth lens 140.

TABLE 2

|  | Index of Refraction | Abbe Number |
|---|---|---|
| First lens 110 | 1.5312 (n1) | 56.0 (v1) |
| Second lens 120 | 1.5312 (n2) | 56.0 (v2) |
| Third lens 130 | 1.6400 (n3) | 23.0 (v3) |
| Fourth lens 140 | 1.5312 (n4) | 56.0 (v4) |

All of the first lens 110, the second lens 120, and the fourth lens 140 may be formed of the same material, whereas the third lens 130 may be formed of a different material. The index of refraction n3 of the third lens 130 may be greater than 1.61 and less than 1.66 on the basis of the d-line and, for example, may be 1.640. The Abbe number of the third lens 130 may be greater than 21 and less than 27 on the basis of the d-line and, for example, may be 23.

The lenses may be formed of plastic in order to correct chromatic aberration, and one lens may be formed of a plastic composition that is different from the others. In the present invention, the third lens 130 may be formed of a different material.

In particular, the indices of refraction of the first lens 110, the second lens 120, and the fourth lens 140 may be 1.5 or more, and the Abbe number thereof may be 50 or more.

Figure 2:
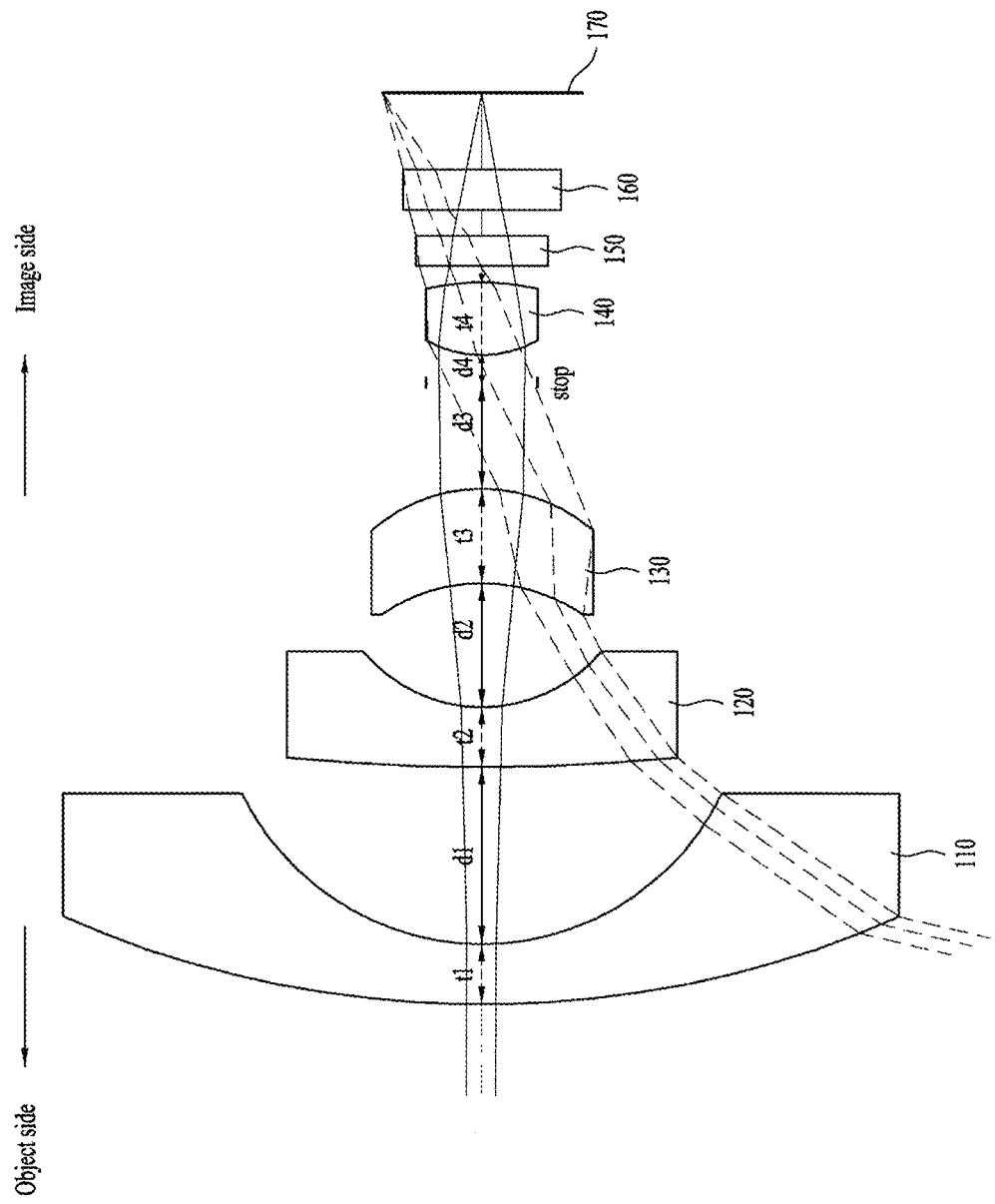
FIG. 2 is a view illustrating thicknesses of respective lenses and distances between the lenses provided in the image pickup lens of FIG. 1.

When the lenses are configured as glass mold lens, it is necessary to set a high press temperature for lens formation FIG. 2 is a view illustrating thicknesses of the respective lenses and distances between the lenses provided in the image pickup lens of FIG. 1.

On the optical axis, the thickness t1 of the first lens 110 is 0.600 mm, the thickness t2 of the second lens 120 is 0.725 mm, the thickness t3 of the third lens 130 is 1.142 mm, and the thickness t4 of the fourth lens 140 is 0.670 mm.

In addition, on the optical axis, the distance d1 between the first lens 110 and the second lens 120 is 1.840 mm, the distance d2 between the second lens 120 and the third lens 130 is 1.220 mm, the distance d3 between the third lens 130 and the stop is 1.400 mm, and the distance d4 between the stop and the fourth lens 140 is 0.1 mm or less and, for example, may be 0.085 mm. Here, the smaller distance d4 between the stop and the fourth lens 140 may be advantageous to improve the resolution of the image pickup lens.

FIG. 3 is a graph illustrating aberrations of the image pickup lens, including longitudinal spherical aberration, astigmatic field curves, and distortion, in sequence from the left side.

In FIG. 3, the Y-axis means the size of an image and the X-axis means the focal distance (in units of mm) and distortion (expressed as a %). It will be appreciated that aberration correction may be improved as the curves are closer to the Y-axis.

A camera module including the image pickup lens as described above may be mounted in various digital devices such as, for example, a digital camera, a smartphone, a laptop computer, and a tablet PC.

As is apparent from the above description, an image pickup lens according to the embodiments may have a smaller size and higher performance.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image pickup lens comprising a first lens to a fourth lens arranged in sequence from an object side to an image side, the first lens to the fourth lens each having refraction;
   wherein the first lens and the second lens have negative refraction,
   wherein the first lens has a second surface facing the image side, and a ratio of an effective radius to a radius of curvature in relation to the second surface is less than 0.96;
   wherein the first lens, the second lens, and the fourth lens are formed of plastic; and
   wherein the third lens has a meniscus shape so as to be concave toward the object side.

2. The image pickup lens according to claim 1, wherein the second lens has a second surface facing the image side, and a ratio of an effective radius to a radius of curvature in relation to the second surface of the second lens is less than 0.96.

3. The image pickup lens according to claim 1, wherein the third lens and the fourth lens have positive refraction.

4. The image pickup lens according to claim 1, wherein the second lens has a first surface facing the object side, and an effective radius of the first surface is less than the effective radius of the second surface of the first lens.

5. The image pickup lens according to claim 1, wherein an index of refraction of the third lens is greater than 1.61 and less than 1.66.

6. The image pickup lens according to claim 1, wherein an Abbe number of the third lens is greater than 21 and less than 27.

7. The image pickup lens according to claim 1, wherein indices of refraction of the first lens, the second lens, and the fourth lens are 1.5 or more.

8. The image pickup lens according to claim 1, wherein Abbe numbers of the first lens, the second lens, and the fourth lens are 50 or more.

9. The image pickup lens according to claim 1, wherein the first lens has a second surface facing the image side, and wherein the second surface of the first lens is concave.

10. The image pickup lens according to claim 1, wherein the second lens has a second surface facing the image side, and wherein the second surface of the second lens is concave.

11. The image pickup lens according to claim 1, further comprising a stop located between the third lens and the fourth lens.

12. The image pickup lens according to claim 11, wherein a distance between the stop and an object surface of the fourth lens is 0.1 mm or less.

13. The image pickup lens according to claim 1, wherein both surfaces of the fourth lens have a convex shape.

14. An image pickup lens comprising a first lens to a fourth lens arranged in sequence from an object side to an image side, the first lens to the fourth lens each having refraction,
   wherein the first lens and the second lens each have negative refraction,
   wherein the third lens has a meniscus shape so as to be concave toward the object side, and
   wherein the second lens has a second surface facing the image side, and a ratio of an effective radius to a radius of curvature in relation to the second surface is less than 0.96.

15. The image pickup lens according to claim 14, wherein the first lens has a second surface facing the image side, and a ratio of an effective radius to a radius of curvature in relation to the second surface of the first lens is less than 0.96.

16. The image pickup lens according to claim 14, wherein the second lens has a first surface facing the object side, and an effective radius of the first surface of the second lens is less than an effective radius of a second surface of the first lens.

17. The image pickup lens according to claim 14, wherein an index of refraction of the third lens is greater than 1.61 and less than 1.66.

18. The image pickup lens according to claim 14, wherein an Abbe number of the third lens is greater than 21 and less than 27.

19. A camera module comprising:
   an image pickup lens including a first lens to a fourth lens arranged in sequence from an object side to an image side, the first lens to the fourth lens each having refraction; wherein the first lens and the second lens have negative refraction, wherein the first lens has a second surface facing the image side, and a ratio of an effective radius to a radius of curvature in relation to the second surface is less than 0.96; wherein the first lens, the second lens, and the fourth lens are formed of plastic; and wherein the third lens has a meniscus shape so as to be concave toward the object side;
   a filter configured to selectively transmit light, having passed through the image pickup lens, based on a wavelength; and
   a light receiving element configured to receive the light having passed through the filter.

* * * * *